(12) United States Patent
Inoshita

(10) Patent No.: US 9,232,128 B2
(45) Date of Patent: Jan. 5, 2016

(54) IMAGE CAPTURE POSITION AND IMAGE CAPTURE DIRECTION ESTIMATION DEVICE, IMAGE CAPTURE DEVICE, IMAGE CAPTURE POSITION AND IMAGE CAPTURE DIRECTION ESTIMATION METHOD AND PROGRAM

(75) Inventor: Tetsuo Inoshita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 107 days.

(21) Appl. No.: 14/007,411

(22) PCT Filed: Mar. 27, 2012

(86) PCT No.: PCT/JP2012/057866
§ 371 (c)(1),
(2), (4) Date: Sep. 25, 2013

(87) PCT Pub. No.: WO2012/133371
PCT Pub. Date: Oct. 4, 2012

(65) Prior Publication Data
US 2014/0015998 A1 Jan. 16, 2014

(30) Foreign Application Priority Data
Mar. 28, 2011 (JP) ................................. 2011-069251

(51) Int. Cl.
*H04N 5/232* (2006.01)
*G06T 7/00* (2006.01)
(52) U.S. Cl.
CPC .............. *H04N 5/232* (2013.01); *G06T 7/0044* (2013.01); *G06T 2207/10028* (2013.01); *G06T 2207/30244* (2013.01)

(58) Field of Classification Search
CPC .......... H04N 5/23212; H04N 13/0221; H04N 5/232; H04N 5/23216; G06F 17/30244
See application file for complete search history.

(56) References Cited

U.S. PATENT DOCUMENTS

| 7,239,339 B2* | 7/2007 | Nagai et al. .................... 348/116 |
| 8,611,592 B2* | 12/2013 | Wallace et al. ............... 382/103 |
| 2001/0055063 A1 | 12/2001 | Nagai et al. |
| 2011/0052073 A1* | 3/2011 | Wallace et al. ............... 382/190 |

FOREIGN PATENT DOCUMENTS

| JP | 2002-48513 A | 2/2002 |
| JP | 2008-20225 A | 1/2008 |
| JP | 2009-20014 A | 1/2009 |

OTHER PUBLICATIONS

Naoyuki Yazawa, et al., "Image Based View Localization System Retrieving from a Panorama Database by SURF", 11th IAPR Conference on Machine Vision Applications (MVA), May 20-22, 2009, pp. 118-121.

\* cited by examiner

*Primary Examiner* — Ahmed A Berhan
(74) *Attorney, Agent, or Firm* — Sughrue Mion, PLLC

(57) ABSTRACT

An image capture position and direction estimation device includes a region determination unit that determines a plurality of regions to be associated between a query image and an image with position and direction, a depth estimation unit that estimates a depth of each region, and an image capture position and direction estimation unit that estimates a direction in the region with a large depth estimated by the depth estimation unit and estimates a position in the region with a small depth estimated by the depth estimation unit.

10 Claims, 8 Drawing Sheets

DISTANCE BETWEEN ASSOCIATED CHARACTERISTIC POINTS
(QUERY IMAGE SERVES AS REFERENCE)

IMAGE CAPTURE POSITION AND IMAGE CAPTURE DIRECTION ESTIMATION DEVICE, IMAGE CAPTURE DEVICE, IMAGE CAPTURE POSITION AND IMAGE CAPTURE DIRECTION ESTIMATION METHOD AND PROGRAM

CROSS REFERENCE TO RELATED APPLICATIONS

This application is a National Stage of International Application No. PCT/JP2012/057866, filed on Mar. 27, 2012, which claims priority from Japanese Patent Application No. 2011-069251, filed on Mar. 28, 2011, the contents of all of which are incorporated herein by reference in their entirety.

TECHNICAL FIELD

The present invention relates to an image capture position and image capture direction estimation device (image capture position direction estimation device), an image capture device, an image capture position and image capture direction estimation method (image capture position direction estimation method) and a program, and more particularly, an image capture position and image capture direction estimation device, an image capture device, an image capture position and image capture direction estimation method and a program in which landmark positioning information is not necessary.

BACKGROUND ART

As methods of estimating a self-position at the time of image capture based on an image captured by a camera, methods (Patent Documents 1 and 2) of estimating a self-position from a plurality of landmarks detected from an image and a method (Non-Patent Document 1) of performing matching with a previously captured image group to which a position and a direction are assigned have been suggested. Here, the self-position refers to information indicating a position and an image capture direction at the time of image capture.

Patent Document 1 discloses a technology for estimating a self-position based on position information, in which a building, a mark, or the like used as a landmark is positioned in advance by a highly accurate GPS (Global Positioning System) device, and a camera parameter of an image capture device.

In the estimation method, an angle is calculated per pixel from a camera parameter of the camera used to capture an image, a constrained circle in which there is a probability that the self-position is present is defined from the maximum angle of nip and the minimum angle of nip between landmarks, and a score is calculated using a model which defines a likelihood of an angle of nip. Further, the score calculated for each of the spaces between the landmarks is added to a coordinate position and the coordinate position with the maximum score is estimated as the self-position.

Patent Document 2 discloses a method of estimating a self-position in consideration of the degree of coincidence when landmarks are detected. In the estimation method, the degree of coincidence between an object in a captured image and a landmark is calculated using a database that stores the positions of landmarks on a map and an amount of a characteristic. Thereafter, a self-existence range used to estimate the self-position in the order of the higher degree of coincidence of the landmark is determined. Accordingly, when a plurality of landmarks are extracted, a position error of a landmark with a low degree of coincidence can be reduced, and thus the self-position can be estimated with high accuracy.

Non-Patent Document 1 discloses a method of estimating a self-position by associating an image database with an input image. In the estimation method, a panorama image to which a position and a direction are assigned in advance is generated for each intersection. Characteristics extracted from the input image are associated with characteristics of a panorama image group and a vote is cast for a panorama image in which the association is possible. The position of a panorama image with the most vote results is determined as the self-position. Next, Homography between the input image and the panorama image is calculated, and the input image is projected on the panorama image using the calculated Homography, and the projection center is determined as a direction. In this case, a position at which the panorama image is captured is used as the position.

DOCUMENTS OF THE PRIOR ART

Patent Documents

[Patent Document 1]
Japanese Unexamined Patent Application, First Publication No. 2008-20225
[Patent Document 2]
Japanese Unexamined Patent Application, First Publication No. 2009-20014

Non-Patent Document

[Non-Patent Document 1]
"Image Based View Localization System Retrieving from a Panorama Database by SURF," by Naoyuki Yazawa, Hideaki Uchiyama, Hideo Saito, Myriam Servieres, and Guillaume Moreau in 11th IAPR Conference on Machine Vision Applications (MVA), pp. 118-121, May 20-21, 2009.

DISCLOSURE OF INVENTION

Problem to be solved by the invention

In Patent Document 1, however, the camera parameter of an image capture device is assumed to be known. Therefore, there is a problem that position estimation accuracy may deteriorate when a photographer does not perform calibration to obtain the camera parameter. Further, in Patent Document 1 and Patent Document 2, it is necessary to position the positions of the landmarks using the highly accurate GPS or the like. Therefore, a task is required to position the positions or the widths/heights of the landmarks.

Further, in Non-Patent Document 1, the input image is associated with the panorama images stored in the database. Therefore, since images are required to be captured densely to generate the panorama image, it takes some time to generate the database. Moreover, since the position at which the panorama image stored in the database is captured is determined as the self-position, there is a problem that the self-position estimation accuracy may deteriorate as the position at which the input image is captured is more distant from the position at which the panorama image is captured.

An object of the present invention is to provide an image capture position and image capture direction estimation device, an image capture device, an image capture position and image capture direction estimation method and a program capable of estimating an image capture position and an image capture direction even when a position (hereinafter referred to as an image capture position; corresponding to the above-described self-position) at which a photographer photographs (captures) an image is distant from a position at which an image to which a position and a direction are assigned in advance is captured.

Means for solving the problem

According to the invention, an image capture position and direction estimation device includes: a region determination unit that determines a plurality of regions to be associated between an image captured by an image capture device and a predetermined image; a depth estimation unit that estimates depth estimation information corresponding to a depth of each of the plurality of regions; and an image capture position and image capture direction estimation unit that estimates an image capture direction of the image capture device according to the region with a large depth and estimates an image capture position of the image capture device according to the region with a small depth based on the depth estimation information estimated by the depth estimation unit.

Effects of the Invention

According to the present invention, the region determination unit determines the plurality of regions to be associated between the image captured by the image capture device and the predetermined image. The depth estimation unit estimates the depth estimation information corresponding to the depth of each of the plurality of regions. The image capture position and image capture direction estimation unit estimates the image capture direction of the image capture device according to the region with the large depth and estimates the image capture position of the image capture device according to the region with the small depth based on the depth estimation information estimated by the depth estimation unit. Accordingly, for example, by assigning the position and the direction in advance to the predetermined image, the image capture position and image capture direction estimation unit can estimate the position and the direction of the image captured by the image capture device based on the depth estimation information estimated by the depth estimation unit and the position and the direction assigned in advance to the predetermined image. That is, for example, by preparing the image to which the position and the direction are assigned irrespective of a specific landmark, it is possible to estimate the position and the direction of the image captured by the image capture device. Accordingly, positioning information regarding a landmark or camera parameter information may not necessarily be used. Further, the depth estimation information regarding the region is calculated by the depth estimation unit. Therefore, by using the depth estimation information, it is possible to estimate the image capture position and the image capture direction, even when the image to which the position and the direction are assigned in advance is distant from the position at which the image to which the position and the direction are assigned in advance is captured.

EMBODIMENTS FOR CARRYING OUT THE INVENTION

First embodiment

Figure 1:
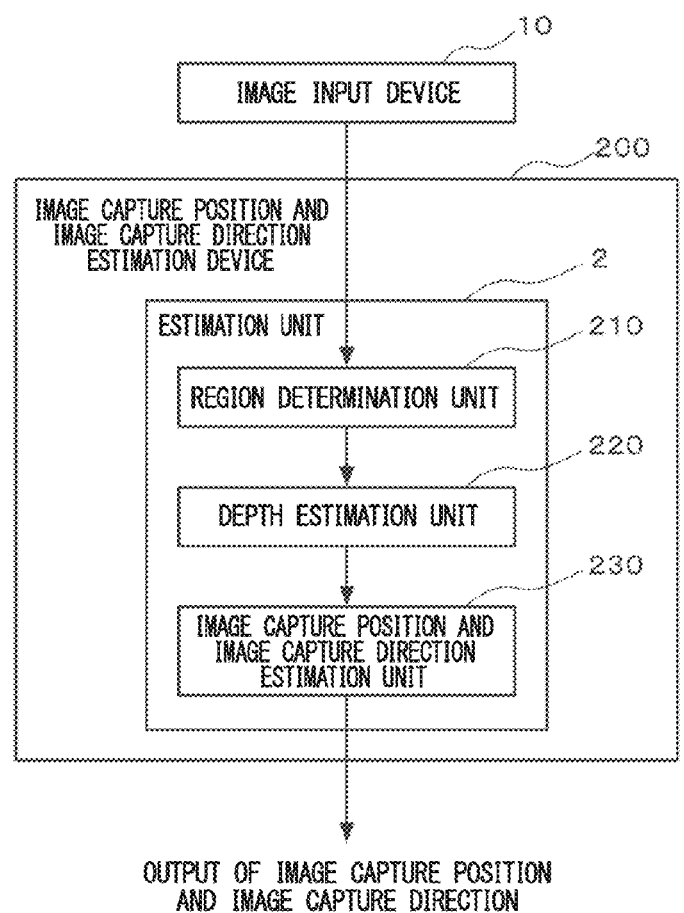
FIG. 1 is a block diagram representing an image capture position and image capture direction estimation device according to a first example of the present invention.

Hereinafter, embodiments of the present invention will be described with reference to the drawings. FIG. 1 is a block diagram representing the constitution of an image capture position and image capture direction estimation device (image capture position direction estimation device) 200 according to a first embodiment of the present invention.

The image capture position and image capture direction estimation device 200 includes an estimation unit 2. The estimation unit 2 includes a region determination unit 210 that determines a plurality of regions to be associated from an image captured by the image capture device, a depth estimation unit 220 that estimates a distant view and a near view of the extracted region, that is, estimate information (hereinafter referred to as depth information (depth estimation information)) indicating the depth of each region, and an image capture position and image capture direction estimation unit 230 that estimates an image capture position and an image capture direction using the estimated depth information. The image capture position and image capture direction estimation device 200 is a device that estimates a position and a direction of a query image (inquiry image) input from an image input device 10 based on the query image. The image capture position and image capture direction estimation device 200 can be configured to include, for example, a CPU (Central Processing Unit) and a storage device and can be configured to operate by causing the CPU to execute a predetermined program stored in the storage device.

The query image is, for example, an image that is captured using an image capture device such as a digital camera or a video camera by a user to estimate an image capture position.

The image input device 10 inputs the query image and an image to which the position direction information is assigned to the image capture position and image capture direction estimation device 200. Here, the image to which the position direction information is assigned is an image to which a position and a direction are assigned in advance. The image to which the position direction information is assigned is, for example, a plurality of still images that are actually captured or an image of each frame of a continuously captured moving image. The position and the direction to be assigned are a position of an image capture device and an image capture direction at the time of image capture. It is not necessary to associate the image to which the position direction information is assigned according to the present invention with a specific landmark and to register the position or the direction (however, the position and the direction may be registered). Here, an image to which a plurality of pieces of position direction information are assigned is input with respect to one query image or a plurality of query images.

The region determination unit 210 determines a plurality of regions to be used to perform the association between the query image input from the image input device 10 and the image to which the position and direction information is assigned.

The depth estimation unit 220 estimates information indicating a distant view or a near view, that is, a depth, for each of the regions determined by the region determination unit 210 and used to perform the association. Further, the estimation result may be expressed by discrete values of the distant view and the near view or may be expressed by continuous values indicating the distant view and the near view. That is, the depth estimation unit 220 estimates depth estimation information corresponding to a depth of each of the plurality of regions.

Based on the depth information on each of the associated regions, the image capture position and image capture direction estimation unit 230 performs the association on the regions with a large depth (distant view) to estimate the direction from the result and performs the association on the regions with a small depth (near view) to estimate the position from the result. Further, information regarding the direction and the position estimated by the image capture position and image capture direction estimation unit 230 is output as image capture position and image capture direction outputs to a predetermined device. That is, based on the depth estimation information estimated by the depth estimation unit 220, the image capture position and image capture direction estimation unit 230 estimates the image capture direction of the image capture device according to the regions with the large depth and estimates the image capture position of the image capture device according to the regions with the small depth.

In other words, based on the depths of the regions associated between the query image captured by the image capture device and the image to which the position direction information is assigned, the image capture position and image capture direction estimation unit 230 determines whether to estimate the position or estimate the direction from the associated regions. Then, the image capture position and image capture direction estimation unit 230 estimates, as an image capture position, the position of a predetermined image corresponding to a region of which a position is determined to be estimated and estimates, as an image capture direction, the direction of a predetermined image corresponding to a region of which a direction is determined to be estimated.

Further, the region with a large depth means a region that has a depth of a relatively large value (that is, a value larger than a depth of another region in comparison to the other region) among a plurality of regions in one image or a region that has a depth of an absolutely large value (that is, a value larger than a predetermined reference value). For example, the region with a large depth is a region that has a large depth among a plurality of regions, a region that has a higher order than an order determined in advance when the depth estimation information is arranged in a higher order among the plurality of regions, or a region in which the depth estimation information is larger than a threshold value determined in advance among the plurality of regions. Further, like the region with a large depth, a region with a small depth means a region that has a depth of a relatively small value among a plurality of regions in one image or a region that has a depth of an absolutely small value.

Next, an operation according to this embodiment will be described using examples of the specific images represented in FIG. 2.

First, the region determination unit 210 determines regions to be associated from a query image 20 and an image 30 (hereinafter, referred to as an image 30 with position and direction) to which the position direction information is assigned. For example, a portion of an image corresponding to a mark on a road or a signboard of a shop is set to an association region. In the example represented in FIG. 2, 8 regions 21 to 28 in the query image 20 and 8 regions 31 to 38 in the image 30 with position and direction are determined as association regions. In this case, the regions 21 to 28 and the regions 31 to 38 are set to be associated by the image capture position and image capture direction estimation unit 230.

Next, the depth estimation unit 220 determines whether the association regions 21 to 28 (or the association regions 31 to 38) are distant views or near views (that is, estimates the depth of each association region). For example, when the query image 20 is acquired as a moving image and a movement distance of an association region between frames is small, the association region is determined as a distant-view region. When a movement distance of an association region between frames is large, the association region is determined as a near-view region. That is, for example, a movement distance between the region 28 of an $n^{th}$ frame (where n is a natural number) of the query image 20 and the region 28 of an $n+1^{th}$ frame is calculated. When this movement distance between the frames is large, this region is determined as a near-view region. Further, for example, a movement distance between the region 22 of an $n^{th}$ frame of the query image 20 and the region 22 of an $n+1^{th}$ frame is calculated. When this movement distance between the frames is small, this region is determined as a distant-view region. Further, the estimation of the depth by the depth estimation unit 220 is not limited to this method. For example, when the query image 20 is a still image, the determination of the distant view and the near view may be performed with reference to a depth value set for each image capture scene according to a comparison result between a plurality of image capture scenes of near views and distant views registered in advance. Further, the estimation of the depth may be performed by setting the regions 31 to 38 or the like in the image 30 with position and direction as references.

Next, the image capture position and image capture direction estimation unit 230 associates the regions of the query image 20 and the plurality of images 30 with position and direction and estimates a direction from the associated regions of distant views. For example, the image capture position and image capture direction estimation unit 230 compares the regions estimated to be the distant views between one query image 20 and the plurality of images 30 with position and direction, determines the image 30 with position and direction having a region relatively highly similar (or relatively highly homologous) to a region estimated to be the distant view in the query image 20, and estimates a direction set in the image 30 with position and direction as a direction of the query image 20.

Further, the image capture position and image capture direction estimation unit 230 may perform the association on the plurality of images 30 with position and direction, acquire the directions of the associated images, calculate an average value, and estimate an estimated direction. Further, the direction may be calculated by multiplying a weight according to the association distance. For example, the direction is valued by increasing a weight as the association distance is shorter. Further, the direction is disvalued by decreasing a weight as the association distance is longer. This is because it can be determined that the images are captured from substantially the same composition when the association distance is shorter.

Next, the image capture position and image capture direction estimation unit 230 estimates the position in the associated regions of the near views. For example, the image capture position and image capture direction estimation unit 230 compares the regions estimated to be near views between one query image 20 and the plurality of images 30 with position and direction, determines the images 30 with position and direction having a region relatively highly similar (or relatively highly homologous) to a region estimated to be the near view in the query image 20, and estimates a position set in the image 30 with position and direction as a position of the query image 20. At this time, the image capture position and image capture direction estimation unit 230 may correct a position set in the image 30 with position and direction having a relatively highly similar (or relatively highly homologous) region using a depth estimated by the depth estimation unit 220, and set the position as the estimated position of the query image 20.

Further, the image capture position and image capture direction estimation unit 230 may perform the association on the plurality of images 30 with position and direction, acquire positions of the associated images, calculate an average value, and estimate an estimated position. Further, the position may be calculated by multiplying a weight according to the association distance. For example, when the association distance becomes shorter, a weight is increased and the position is regarded to be more important. Further, when the association distance becomes longer, a weight is decreased and the position is regarded to be less important. This is because it can be determined that the images are captured from substantially the same composition when the association distance is shorter.

That is, for example, based on the depths of the regions associated between the query image captured by the image capture device and the images to which a plurality of pieces of position direction information are assigned, the image capture position and image capture direction estimation unit 230 determines whether to estimate the position or to estimate the direction from these regions and performs weighting on the images to which the position direction information is assigned according to distances between the associated regions. Then, the image capture position and image capture direction estimation unit 230 estimates, as the image capture position, the position of the image to which the position direction information is assigned and which corresponds to the region of which the position is determined to be estimated by multiplying the position by the weight. Further, the image capture position and image capture direction estimation unit 230 may estimate, as the image capture direction, the direction of the image to which the position direction information is assigned and which corresponds to the region of which the direction is determined to be estimated by multiplying the position by weight.

According to this embodiment, the region determination unit 210 determines the plurality of regions to be associated between an image captured by the image capture device and the predetermined image and the depth estimation unit 220 estimates the depth information according to each of the depths of the plurality of regions. Then, the image capture position and image capture direction estimation unit 230 estimates the image capture direction of the image capture device according to the region with a large depth based on the depth information estimated by the depth estimation unit 220, and estimates the image capture position of the image capture device according to the region with a small depth. At this time, the position and the direction are assigned in advance to the image 30 with position and direction. Accordingly, the image capture position and image capture direction estimation unit 230 can estimate the position and the direction of the query image 20 based on the depth of the region estimated by the depth estimation unit 220 and the position and the direction assigned in advance to the image 30 with position and direction. That is, for example, the position and the direction of the query image 20 can be estimated by preparing the image 30 with position and direction to which the position and the direction are assigned. At this time, the information regarding the position and the direction assigned to the image 30 with position and direction may not be information corresponding to a specific landmark. That is, landmark positioning information or camera parameter information may not necessarily be used. Further, the depth estimation unit 220 is configured to estimate the depth of the region. Therefore, the image capture position can be estimated using the estimated depth information, even when the image 30 with position and direction to which the position and the direction are assigned in advance is distant from a position at which the image is captured.

Second Embodiment

Figure 3:
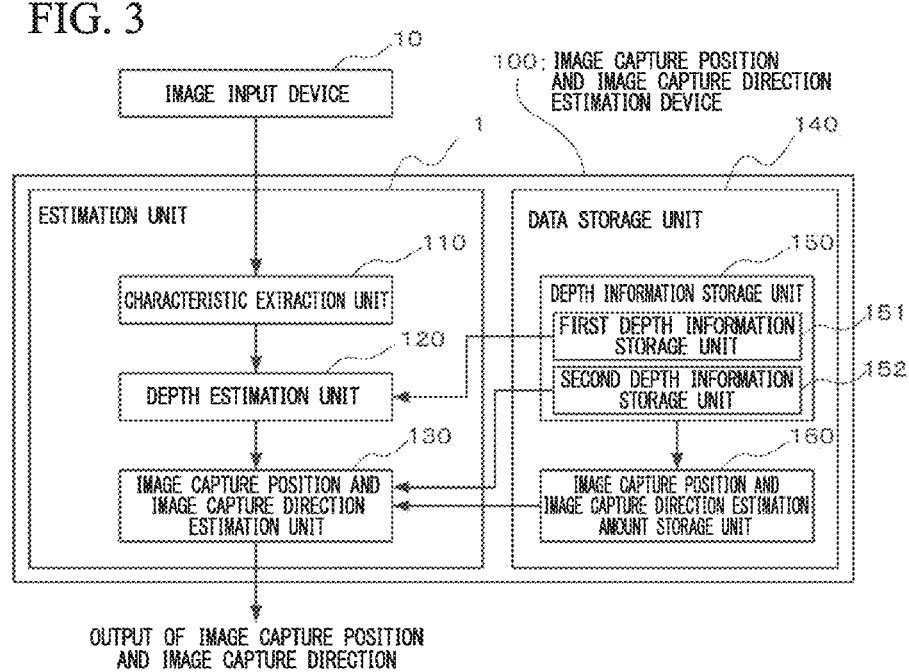
FIG. 3 is a block diagram representing an image capture position and image capture direction estimation device according to a second example of the present invention.

Next, a second embodiment of the present invention will be described with reference to FIGS. 3 to 8. FIG. 3 is a block diagram representing the constitution of an image capture position and image capture direction estimation device 100 according to the second embodiment of the present invention. The image capture position and image capture direction estimation device 100 according to this embodiment includes an estimation unit 1 and a data storage unit 140. The estimation unit 1 includes a characteristic extraction unit 110 that extracts characteristics from an image and determines regions to be subjected to the association, a depth estimation unit 120 that estimates depth information regarding the regions (hereinafter referred to as characteristic regions) from which characteristics are extracted, and an image capture position and image capture direction estimation unit 130 that associates the estimated characteristic regions and estimates an image capture position according to the depth information and the association result. The image capture position and image capture direction estimation device 100 can be configured to include, for example, a CPU and a storage device and can be configured to operate by causing the CPU to execute a predetermined program stored in the storage device. The same reference numerals are given to the same constituent elements as those represented in FIG. 1.

One region or a plurality of regions (for example, characteristic points or grids to be described below) from which the characteristics are extracted by the characteristic extraction unit 110 correspond to the association regions (for example, the regions 21 to 28 or 31 to 38 in FIG. 2) according to the first embodiment. Further, the characteristic extraction unit 110 is configured to correspond to the region determination unit 210 according to the first embodiment.

The characteristic extraction unit 110 performs predetermined image processing to extract characteristics from a query image input from the image input device 10 and determines one region or a plurality of regions from which the characteristics are extracted as regions to be subjected to the association by the image capture position and image capture direction estimation unit 130. Further, the characteristic extraction unit 110 extracts characteristics even from an image to which position direction information is assigned, and determines one region or a plurality of regions from which the characteristics are extracted. As a characteristic extraction method, a method of extracting characteristics of characteristic points in an image, such as SIFT (Scale-Invariant Feature Transform) characteristics or SURF (Speeded Up Robust Features) characteristics may be used. A method of dividing an image into grids and extracting the characteristics from the grids may be used.

The depth estimation unit 120 assigns the depth estimation information stored in a first depth information storage unit 151 to be described below to the characteristic region extracted by the characteristic extraction unit 110. The depth estimation information, that is, a depth value dependent on a position in an image, is used when contribution distribution (position estimation contribution distribution) parameters set to estimate a position by the image capture position and image capture direction estimation unit 130 and contribution distribution (direction estimation contribution distribution) parameters set to estimate a direction are read from a second depth information storage unit 152 to be described below.

The image capture position and image capture direction estimation unit 130 associates the characteristic regions of the query image with the characteristic regions of the image to which the position direction information is assigned and calculates amounts of movement between the associated characteristic regions. The amount of movement means a distance and a direction between the characteristic regions. Further, the image capture position and image capture direction estimation unit 130 selects, from the calculated amount of movement between the characteristic regions, distributions of a position movement amount and a direction deviation amount for the image to which the position direction information is assigned, using the image capture position and image capture direction estimation amount storage unit 160 that stores a movement amount distribution of the position or the direction. Then, the image capture position and image capture direction estimation unit 130 estimates the image capture position and the image capture direction based on the position estimation contribution distribution and the direction estimation contribution distribution read from the second depth information storage unit 152 and the position movement amount and direction deviation amount distributions of all of the characteristic regions.

The data storage unit 140 includes a depth information storage unit 150 and an image capture position and image capture direction estimation amount storage unit 160. The depth information storage unit 150 includes the first depth information storage unit 151 and the second depth information storage unit 152. The first depth information storage unit 151 stores a depth value according to an image capture scene. The depth value may be a relative value by which a magnitude relation of depths can be understood or may be an absolute value such as a distance value. Further, the second depth information storage unit 152 stores the parameters of the position estimation contribution distribution and the parameters of the direction estimation contribution distribution, and thus such a parameter is selected according to a depth value. For example, in the position estimation contribution distribution, the smaller the depth is, the higher the degree of contribution is. In the direction estimation contribution distribution, the smaller the depth is, the lower the degree of contribution is. This means that a nearby characteristic region is used to estimate the position and a distant characteristic region is used to estimate the direction. The image capture position and image capture direction estimation amount storage unit 160 stores an amount of movement between the characteristic region extracted from the query image and the characteristic region extracted from the image to which the position and the direction are assigned and the parameters set to estimate an amount of movement of the position and an amount of deviation of the direction from the depth information.

Figure 4:
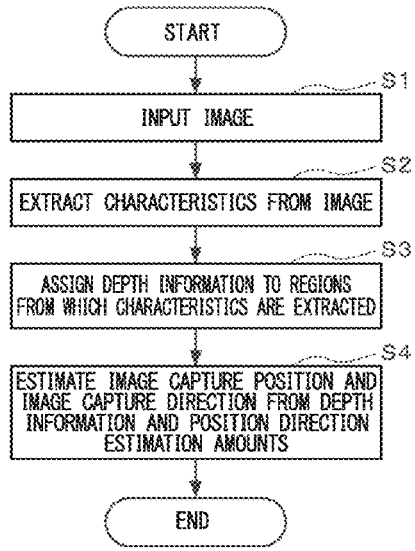
FIG. 4 is a flowchart representing an operation of the image capture position and image capture direction estimation device in FIG. 3.

Next, an operation will be described with reference to the flowchart of FIG. 4.

First, the characteristic extraction unit 110 inputs a query image captured at a place at which an image capture position and an image capture direction are desired to be estimated from the image input device 10 (step S1). Next, the characteristic extraction unit 110 extracts characteristics from the image (step S2).

Next, the depth estimation unit 120 assigns the extracted characteristic regions the depth values and the depth information including the parameter of the position estimation contribution distribution and parameter of the direction estimation contribution distribution obtained from the depth value, referring to the depth information storage unit 150 (step S3). That is, the depth estimation unit 120 estimates the depth estimation information by determining an image capture scene of the query image and reading the depth information corresponding to the determined image capture scene from the first depth information storage unit 151.

Next, the image capture position and image capture direction estimation unit 130 calculates the amount of movement between the associated characteristic regions from the association result between the characteristic region of the query image and the characteristic region of the image to which the position direction information are assigned in advance, referring to the depth information storage unit 150 and the image capture position and image capture direction estimation amount storage unit 160, and estimates the image capture position and the image capture direction using the depth information (step S4). More specifically, the image capture position and image capture direction estimation unit 130 reads the position estimation contribution distribution and the direction estimation contribution distribution from the second depth information storage unit 152 based on the depth estimation information estimated by the depth estimation unit 120. Subsequently, the image capture position and image capture direction estimation unit 130 reads the position movement amount distribution and the direction deviation amount distribution from the image capture position and image capture direction estimation amount storage unit 160 based on the corresponding distance and direction between the regions associated by the characteristic extraction unit 110. Then, the image capture position and image capture direction estimation unit 130 estimates the image capture position based on the read position estimation contribution distribution and the read position movement amount distribution and estimates the image capture direction based on the read direction estimation contribution distribution and the read direction deviation amount distribution.

Next, an operation of this embodiment will be described giving a specific example.

First, data stored in the data storage unit 140 will be described.

The first depth information storage unit 151 stores the depth value according to the image capture scene in advance.

For example, when it is determined that the image capture scene is an "outdoor" scene (see FIG. 5A), the image capture scene has a composition of a general street and can be defined such that an upper side of the image is at a long distance from the image capture position and a lower side of the image is at a near distance extracted from a ground surface or the like. In this case, a value obtained when the depth value increases from the lower side to the upper side of the image is stored as the depth information (see FIG. 5B). FIG. 5B is a diagram representing an example of the depth information corresponding to the image of FIG. 5A expressed by grayscale. The whiter a color is the larger the depth value is.

Figure 5A:
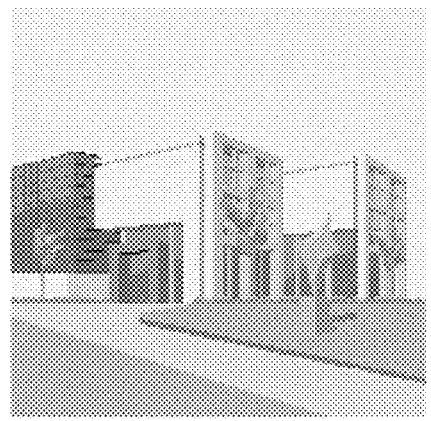
FIG. 5A is a diagram for describing a specific example of a depth value of each image capture scene to describe the operation of the image capture position and image capture direction estimation device in FIG. 3 (an example of an image capture scene: street).
Figure 5B:
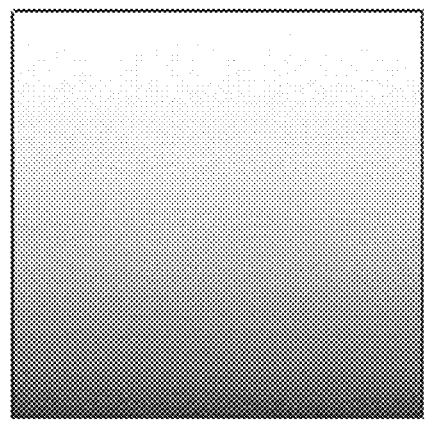
FIG. 5B is a diagram for describing a specific example of a depth value of each image capture scene to describe the operation of the image capture position and image capture direction estimation device in FIG. 3 (depth information of FIG. 5A: the larger the depth value is, the whiter a color is).
Figure 5C:
FIG. 5C is a diagram for describing a specific example of a depth value of each image capture scene to describe the operation of the image capture position and image capture direction estimation device in FIG. 3 (an example of an image capture scene: indoors).
Figure 5D:
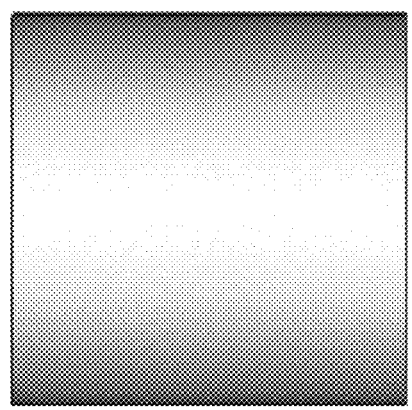
FIG. 5D is a diagram for describing a specific example of a depth value of each image capture scene to describe the operation of the image capture position and image capture direction estimation device in FIG. 3 (depth information of FIG. 5C: the larger the depth value is, the whiter a color is).

For example, when it is determined that the image capture scene is an "indoor" scene (see FIG. 5C), the image capture scene can be defined such that a center of the image is at a long distance from the image capture position and the rest is at a near distance (see FIG. 5D). Further, when various scenes such as an indoor or outdoor scene are assumed as the image capture scenes, the image capture scenes of an image may be determined and the depth information according to the image capture scenes may be acquired or a fixed value may be used irrespective of the image capture scenes.

Figure 6A:
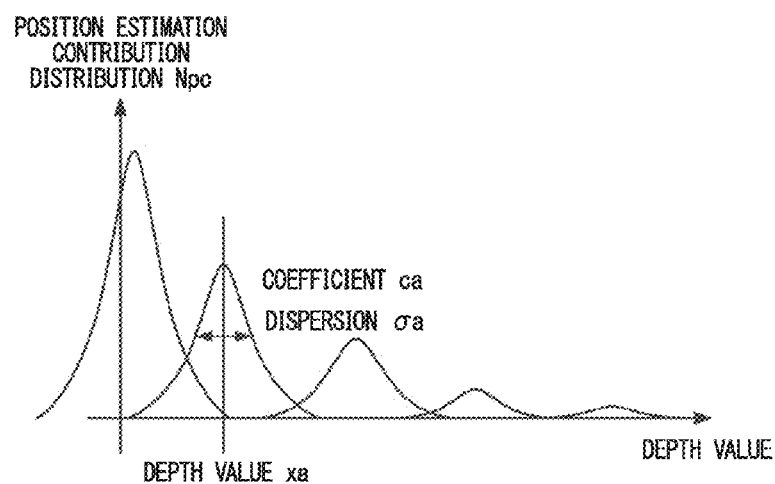
FIG. 6A is a diagram representing a specific example of a position estimation contribution distribution according to a depth value.
Figure 6B:
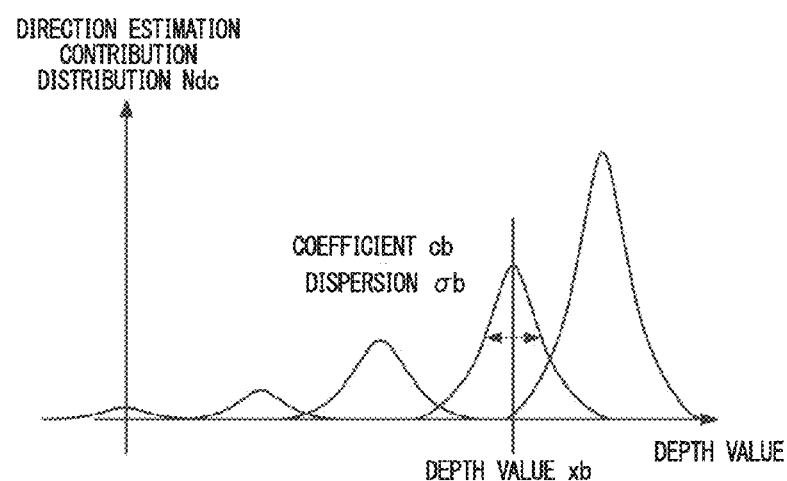
FIG. 6B is a diagram representing a specific example of a direction estimation contribution distribution according to a depth value.

The second depth information storage unit 152 stores the parameters of the position estimation contribution distribution and the direction estimation contribution distribution dependent on the depth value. For example, a depth value $x_a$ is defined as a Gauss distribution including a dispersion $\sigma_a$ and a coefficient $c_a$ as parameters, a position estimation contribution distribution $N_{pc}(x|x_a, \sigma_a, c_a)$ is expressed by Equation (1), and a direction estimation contribution distribution $N_{dc}(x|x_b, \sigma_b, c_b)$ is expressed by Equation (2). For example, in FIG. 6A, the position estimation contribution distribution Npc has a high value, when the depth value is small. The position estimation contribution distribution Npc has a low value, when the depth value is large. On the other hand, the direction estimation contribution distribution Ndc in FIG. 6B shows a contrary tendency. This means that a nearby characteristic region is used to estimate the position and a distant characteristic region is used to estimate the direction. FIGS. 6A and 6B are diagrams representing a plurality of examples of the position estimation contribution distribution Npc and the direction estimation contribution distribution Ndc when the horizontal axis represents the depth value and the vertical axis represents a frequency.

[Equation 1]

$$N_{pc}(x|x_a, \sigma_a, c_a) = \frac{c_a}{\sqrt{2\pi\sigma_a^2}} \exp\left(-\frac{(x-x_a)}{2\sigma_a^2}\right) \quad (1)$$

[Equation 2]

$$N_{dc}(x|x_b, \sigma_b, c_b) = \frac{c_b}{\sqrt{2\pi\sigma_b^2}} \exp\left(-\frac{(x-x_b)}{2\sigma_b^2}\right) \quad (2)$$

Figure 7A:
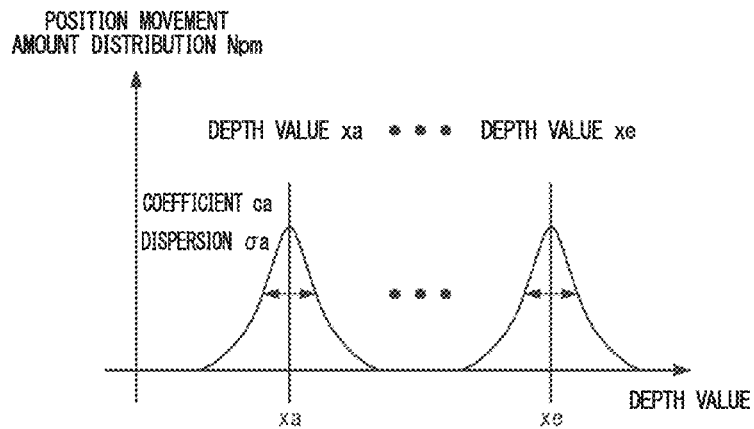
FIG. 7A is a diagram representing a specific example of a position movement amount distribution according to a depth value.
Figure 7B:
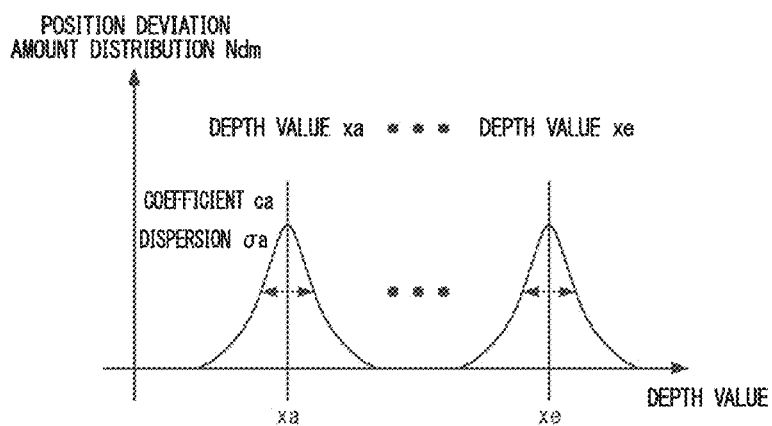
FIG. 7B is a diagram representing a specific example of a direction deviation amount distribution according to a depth value.

The image capture position and image capture direction estimation amount storage unit 160 stores the distributions according to an amount of movement between the characteristic regions. The amount of movement means a distance and a direction. The distance between the characteristic regions is calculated from pixel values, and which meter one pixel of the pixel value corresponds to in practice depends on a depth. An amount of movement per pixel may not be uniquely calculated, since camera parameters vary for each kind of camera. Accordingly, a distribution like which meter one pixel corresponds to is generated for each depth in advance, and parameters of a position movement amount distribution Npm including an amount of movement and a direction between the characteristic regions are stored (FIG. 7A). For example, when a Gauss distribution is assumed, a depth value $x_a$ and a distribution $Npm(x|x_a, \sigma_a, c_a)$ including a dispersion value $\sigma_a$ and a coefficient $c_a$ are set. Likewise, statistical information like which degree one pixel corresponds to is generated for each depth, and a direction deviation amount distribution $Ndm(x|x_a, \sigma_a, c_a)$ is set (FIG. 7B). FIGS. 7A and 7B are diagrams schematically representing distributions of an amount of movement and deviation in two kinds of examples (the depth values $x_a$ and $x_e$) of a position movement amount distribution Npm and a direction deviation amount distribution Ndm when the horizontal axis represents the depth value and the vertical axis represents a frequency.

Next, a case in which the image capture position and image capture direction estimation device 100 estimates a position from a query image captured by a user will be described.

First, the characteristic extraction unit 110 extracts the characteristics from the query image (the query image 20 in FIG. 2) and the image (the image 30 with position and direction in FIG. 2) to which the position direction information is assigned.

Next, when it is determined that the image capture scene of the query image is an "outdoor" scene, the depth estimation unit 120 calculates a depth value $x_{ai}$ for each characteristic region from the depth information regarding the "outdoor" scene (see FIG. 5A). Further, i indicates an index of the characteristic regions in the image. Further, the position estimation contribution distribution $Npc(x|x_a, \sigma_a, c_a)$ and the direction estimation contribution distribution $Ndc(x|x_a, \sigma_a, c_a)$ are calculated from the depth values of all of the characteristic regions. Here, the depth information is calculated for all of the characteristic regions of the query image. However, only the associated characteristic regions to be described below may be calculated.

Figure 2:
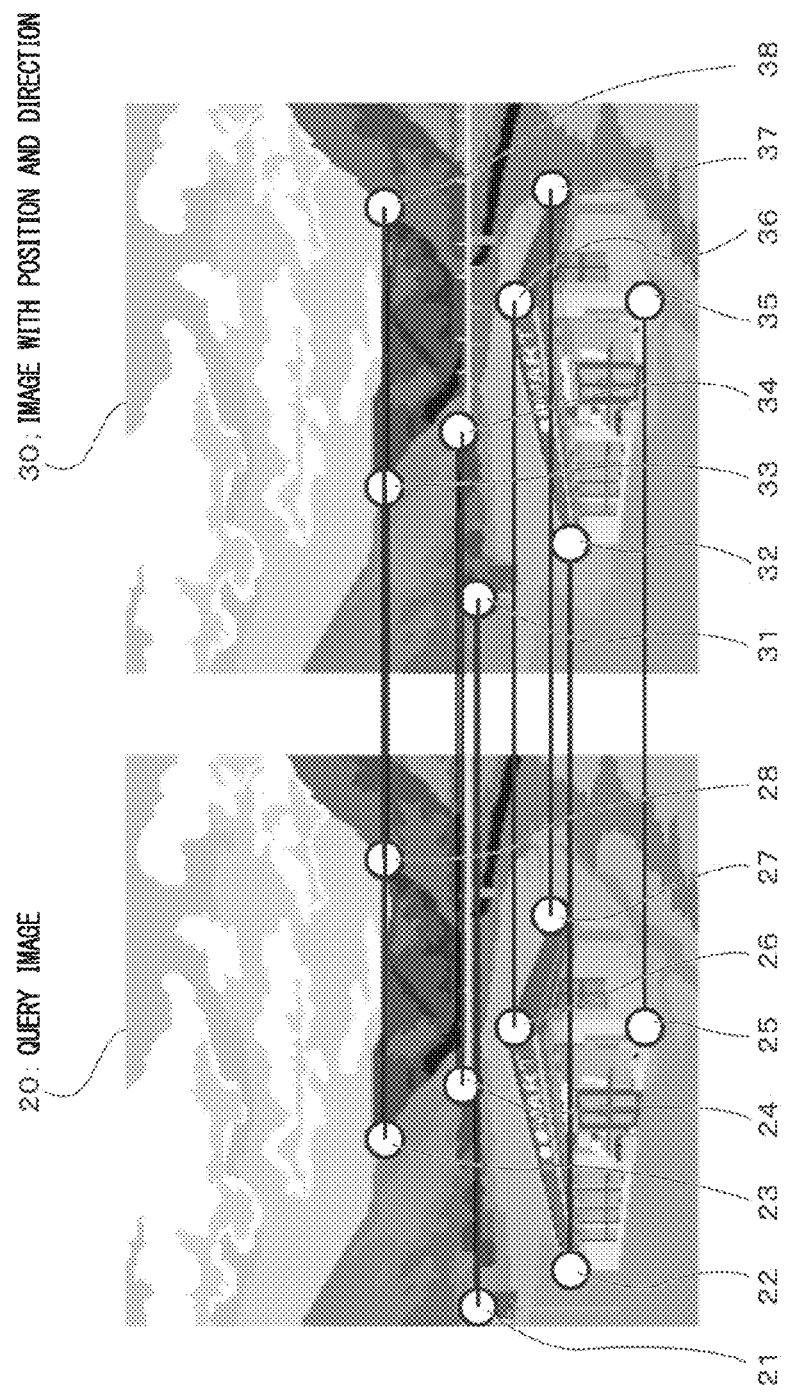
FIG. 2 is a diagram representing examples of a query image to be input to the image capture position and image capture direction estimation device in FIG. 1 and an image to which position direction information is assigned.
Figure 8:
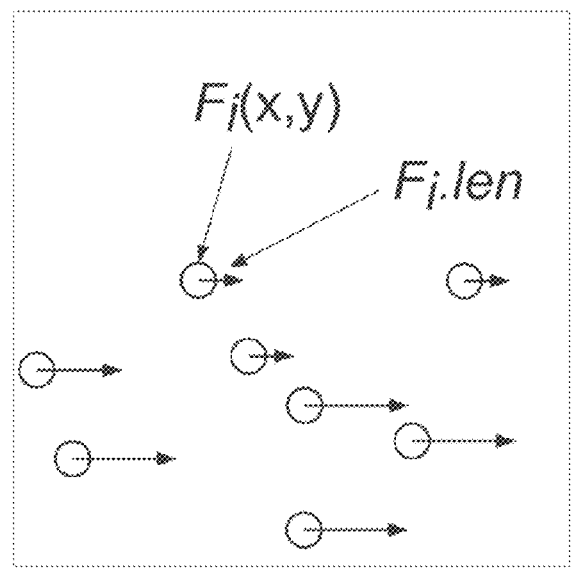
FIG. 8 is a diagram for describing an operation of acquiring a depth value at a given characteristic point from depth information of an "outdoor" scene in the image capture position and image capture direction estimation device in FIG. 3.

Next, the image capture position and image capture direction estimation unit 130 performs the association between the characteristic points extracted by the characteristic extraction unit 110 from the query image (the query image 20 in FIG. 2)

and the image (the image 30 with position and direction in FIG. 2) to which the position direction information is assigned. In the association, distance calculation is performed on each point of the characteristic points of the query image 20 with respect to all of the characteristic points of the image 30 with position and direction. As the result of the distance calculation, the characteristic point of the shortest distance is set as a characteristic point associated with the characteristic points of the image to which the position direction information is assigned. Further, when a difference of the distance value with the characteristic point of the second shortest distance in the association is greater than or equal to a given value, the characteristic point may be associated. $F_i(x, y)$ is assumed to be an associated characteristic point and $F_i.\text{len}$ is assumed to be a distance value between the characteristic points (see FIG. 8). FIG. 8 represents an example of a relation between a plurality of characteristic points indicated by circle marks and a distance between the characteristic points indicated by an arrow mark in the query image indicated by a rectangular frame corresponding to an outdoor scene, as represented in FIG. 5A.

Next, the image capture position and image capture direction estimation unit 130 calculates a position estimation amount and a direction estimation amount. Since a depth $z_i$ and a distance value $F_i.\text{len}$ between the characteristic points are determined in a characteristic point $F_i$, the position movement amount distribution $N_{pm}(x|x_a, \sigma_a, c_a)$ in FIG. 7A and the direction deviation amount distribution $N_{dm}(x|x_a, \sigma_a, c_a)$ in FIG. 7B can be uniquely selected. Thus, a position estimation amount $F_{pi}$ at the characteristic point $F_i$ is calculated from a position movement amount distribution $N_{pmi}$ and a position estimation contribution distribution $N_{pci}$ by Equation (3) below. Further, a direction estimation amount $F_{di}$ at the characteristic point $F_i$ is calculated from a direction deviation amount distribution $N_{dmi}$ and a direction estimation contribution distribution $N_{dci}$ by Equation (4) below. Furthermore, with regard to all of the characteristic points, a position estimation distribution $F_p$ is calculated using a position estimation amount $F_{pi}$ by Equation (5). Likewise, a direction estimation distribution $F_d$ is also calculated using a direction estimation amount $F_{di}$ by Equation (6). A portion in which the distributions are the maximum is the image capture position and image capture direction estimation result. Further, in Equation (3) to (6), X and Π indicate a direct product. Further, σ and c, $σ_i$, or $c_i$ indicate a dispersion and a coefficient of each distribution or estimation amount.

[Equation 3]
$$F_{pi}(x|\sigma_i, c_i) = N_{pmi} \times N_{pci} \quad (3)$$

[Equation 4]
$$F_{di}(x|\sigma_i, c_i) = N_{dmi} \times N_{dci} \quad (4)$$

[Equation 5]
$$F_p(x|\sigma, c) = \prod_i^N F_{pi}(x|\sigma_i, c_i) \quad (5)$$

[Equation 6]
$$F_d(x|\sigma, c) = \prod_i^N F_{di}(x|\sigma_i, c_i) \quad (6)$$

The image capture position and image capture direction estimation device 100 according to this embodiment can estimate the image capture position and the image capture direction, as in the image capture position and image capture direction estimation device 200 described above.

The image capture position and image capture direction estimation device 100 or 200 according to the above-described embodiment can be applied to use of an image capture position and image capture direction estimation device that estimates an image capture position from an image and a program that causes a computer to realize the image capture position and image capture direction estimation device.

Figure 9:
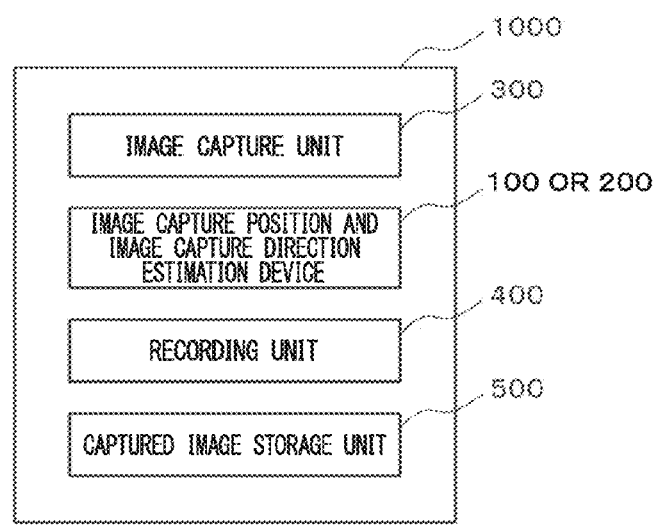
FIG. 9 is a block diagram representing an image capture device according to another embodiment of the present invention.

As represented in FIG. 9, an image capture device 1000 such as a digital camera or a video camera may include the image capture position and image capture direction estimation device 100 or 200 described with reference to FIGS. 1 to 8. In this case, the image capture device 1000 may further include an image capture unit 300, a recording unit 400, and a captured image storage unit 500.

The image capture unit 300 includes an optical system such as a lens or an image capture element such as a CCD (Charge Coupled Device) image sensor, and thus captures an image of light received via an optical system as a captured image by causing the image capture element to convert the image into an electric signal. The image capture unit 300 also captures the above-described query image.

The captured image captured by the image capture unit 300 is input to the image input device 10 described with reference to FIG. 1 or 3. The image capture position and image capture direction estimation device 100 or 200 estimates and outputs the image capture position and the image capture direction based on the image input to the image input device 10, as described with reference to FIGS. 1 to 8.

The image capture unit 300 may correspond to the image input device 10 described with reference to FIG. 1 or 3. In this case, the image capture position and image capture direction estimation device 100 or 200 estimates and outputs the image capture position and the image capture direction based on the captured image captured by the image capture unit 300, as described with reference to FIGS. 1 to 8.

The recording unit 400 registers and stores the captured image captured by the image capture unit 300 in the captured image storage unit 500. Further, when the recording unit 400 registers the captured image captured by the image capture unit 300 in the captured image storage unit 500, the recording unit 400 may register and stores the captured image in the captured image storage unit 500 in association with the image capture position and the image capture direction estimated by the image capture position and image capture direction estimation device 100 or 200.

The captured image storage unit 500 is a storage unit that stores the captured image and may be a storage medium such as a flash memory.

As described with reference to FIG. 9, when the image capture device 1000 includes the image capture position and image capture direction estimation device 100 or 200 according to the above-described embodiment, a self-position can be estimated by estimating an image capture position (and an image capture direction) based on a captured image. The self-position refers to an image capture position and an image capture direction at the time of image capture. Therefore, the image capture device 1000 including the image capture position and image capture direction estimation device 100 or 200 according to the embodiment can be applied to use of position positioning under an environment in which radio waves of the GPS rarely arrive.

The image capture device 1000 serving as a self-position detection device may include the image capture position and image capture direction estimation device 100 or 200 and the image capture unit 300. Even in this case, the image capture device 1000 serving as the self-position detection device can estimate the self-position, as described above.

The image input device 10 including the image capture position and image capture direction estimation device 100 or 200 described with reference to FIG. 1 or 3 may be the image capture unit 300 described with reference to FIG. 9. Even in this case, the image capture position and image capture direction estimation device 100 or 200 serving as the self-position detection device can estimate the self-position, as described above.

The image capture position and image capture direction estimation device 100 or 200 according to the embodiment is not limited to the above-described device. For example, the image capture position and image capture direction estimation device 100 or 200 and the image input device 10 may be integrally configured or the estimation unit 1 and the data storage unit 140 may be integrally configured. Further, part or all of a program executed in the image capture position and image capture direction estimation device 100 or 200 may be distributed through a computer-readable recording medium or a communication line.

Priority is claimed on Japanese Patent Application No. 2011-069251, filed Mar. 28, 2011, the content of which is incorporated herein by reference.

INDUSTRIAL APPLICABILITY

It is possible to provide an image capture position and image capture direction estimation device that estimates a position and a direction at the time of image capture from a captured image without necessity of positioning information such as a landmark.

DESCRIPTION OF REFERENCE SYMBOLS

1 Estimation unit
2 Estimation unit
10 Image input device
20 Query image
30 Image with position and direction
100 Image capture position and image capture direction estimation device
110 Characteristic extraction unit
120 Depth estimation unit
130 Image capture position and image capture direction estimation unit
140 Data storage unit
150 Depth information storage unit
151 First depth information storage unit
152 Second depth information storage unit
160 Image capture position and image capture direction estimation amount storage unit
200. Image capture position and image capture direction estimation device
210. Region determination unit
220. Depth estimation unit
230. Image capture position and image capture direction estimation unit
1000. Image capture device

The invention claimed is:

1. An image capture position direction estimation device comprising:
an image input device configured to input a query image and a predetermined image including position direction information, the query image and the predetermined image having been taken by an image capture device;
a region determination unit that determines a plurality of regions to be associated between the query image and the predetermined image inputted by the image input device;
a depth estimation unit that estimates depth estimation information corresponding to a depth of each of the plurality of regions of the query image according to a determination result of the region determination unit; and
an image capture position and image capture direction estimation unit that estimates, regarding the query image, an image capture direction of the image capture device according to the region with a large depth and an image capture position of the image capture device according to the region with a small depth based on the depth estimation information estimated by the depth estimation unit.

2. The image capture position direction estimation device according to claim 1,
wherein the predetermined image is an image to which a position and a direction are assigned in advance, and
wherein, based on the depth estimation information, the image capture position and image capture direction estimation unit estimates the image capture direction according to a direction assigned to the predetermined image corresponding to the region with the large depth and estimates the image capture position according to a position assigned to the predetermined image corresponding to the region with the small depth.

3. The image capture position direction estimation device according to claim 1, wherein the image capture position and image capture direction estimation unit
determines, based on a depth of the region associated between an image captured by the image capture device and the predetermined image, whether to estimate the position or to estimate a direction from the region,
estimates, as the image capture position, a position of the predetermined image corresponding to the region of which the position is determined to be estimated, and
estimates, as the image capture direction, a direction of the predetermined image corresponding to the region of which the direction is determined to be estimated.

4. The image capture position direction estimation device according to claim 1, wherein the image capture position and image capture direction estimation unit
determines, based on depths of regions associated between an image captured by the image capture device and a plurality of the predetermined images, whether to estimate a position or to estimate a direction from the regions and performs weighting on the predetermined images according to distances between the associated regions,
estimates, as the image capture position, a position of the predetermined image corresponding to the region of which the position is determined to be estimated by multiplying the position by the weight, and
estimates, as the image capture direction, a direction of the predetermined image corresponding to the region of which the direction is determined to be estimated by multiplying the direction by the weight.

5. The image capture position direction estimation device according to claim 1, further comprising:
a first depth information storage unit that stores depth information corresponding to an image capture scene in advance,
wherein the depth estimation unit estimates the depth estimation information by determining an image capture scene of an image captured by the image capture device and reading depth information corresponding to the determined image capture scene from the first depth information storage unit.

6. The image capture position direction estimation device according to claim 1, wherein the region determination unit
   extracts a characteristic from each of an image captured by the image capture device and the predetermined image, and
   determines, as the plurality of regions to be associated between the image captured by the image capture device and the predetermined image, image regions from which the characteristic is extracted among image regions of the image captured by the image capture device and the predetermined image.

7. The image capture position direction estimation device according to claim 6, further comprising:
   a second depth information storage unit that stores a position estimation contribution distribution and a direction estimation contribution distribution in advance according to the depth estimation information in relation with the depth estimation information; and
   an image capture position direction estimation amount storage unit that stores a position movement amount distribution and a direction deviation amount distribution according to a distance and a direction between characteristics in relation with the distance and the direction between characteristics,
   wherein the image capture position and direction estimation unit
   reads the position estimation contribution distribution and the direction estimation contribution distribution from the second depth information storage unit based on the depth estimation information estimated by the depth estimation unit,
   reads the position movement amount distribution and the direction deviation amount distribution from the image capture position direction estimation amount storage unit based on the distance and the direction between characteristics corresponding to the region associated by the region determination unit,
   estimates the image capture position based on the read position estimation contribution distribution and the read position movement amount distribution, and
   estimates the image capture direction based on the read direction estimation contribution distribution and the read direction deviation amount distribution.

8. An image capture device comprising:
   the image capture position direction estimation device according to claim 1.

9. An image capture position direction estimation method comprising:
   inputting a query image and a predetermined image including position direction information by use of an image input device, the query image and the predetermined image having been taken by an image capture device;
   determining a plurality of regions to be associated between the query image and the predetermined image inputted by the image input device;
   calculating depth estimation information corresponding to a depth of each of the plurality of regions of the query image according to a determination result of the determining; and
   estimating, regarding the query image, an image capture direction of the image capture device according to the region with a large depth and an image capture position of the image capture device according to the region with a small depth based on the depth estimation information estimated in the calculating of the depth estimation information.

10. A non-transitory computer-readable medium comprising program causing a computer to perform:
    determining a plurality of regions to be associated between an image captured by an image capture device and a predetermined image;
    calculating depth estimation information corresponding to a depth of each of the plurality of regions; and
    estimating an image capture direction of the image capture device according to the region with a large depth and estimating an image capture position of the image capture device according to the region with a small depth based on the depth estimation information estimated in the calculating of the depth estimation information.

* * * * *